(12) United States Patent
Donoho

(10) Patent No.: US 6,250,023 B1
(45) Date of Patent: Jun. 26, 2001

(54) PREVENTIVE DEVICE AGAINST NUISANCE FROM BIRDS

(76) Inventor: Bruce A. Donoho, 24362 Via Madrugada, Mission Viejo, CA (US) 92692

( * ) Notice: Subject to any disclaimer, the term of this patent is extended or adjusted under 35 U.S.C. 154(b) by 0 days.

(21) Appl. No.: 09/421,018

(22) Filed: Oct. 19, 1999

(51) Int. Cl.[7] ............................................. E04B 1/72
(52) U.S. Cl. ............................................. 52/101
(58) Field of Search ........................... 52/101; 119/713, 119/903; 43/1

(56) References Cited

U.S. PATENT DOCUMENTS

| | | |
|---|---|---|
| 2,456,731 | * 12/1948 | Peles . |
| 2,475,047 | * 7/1949 | Peles . |
| 3,282,000 | * 11/1966 | Shaw et al. . |
| 3,407,550 | * 10/1968 | Shaw . |
| 5,253,444 | * 10/1993 | Donoho et al. . |
| 5,400,552 | * 3/1995 | Negre . |
| 5,433,029 | * 7/1995 | Donoho et al. . |
| 5,648,641 | * 7/1997 | Guthrie . |
| 5,691,032 | * 11/1997 | Treublood et al. . |
| 5,765,319 | * 6/1998 | Callaghan, Jr. . |

* cited by examiner

Primary Examiner—Jose V. Chen

(57) ABSTRACT

A preventative device against nuisance from birds comprised of a base to which spikes are fitted to extend opposite surfaces of a structure to be protected in order to discourage birds from landing on those surfaces. The base is provided with canals and each spike has a knurled end. The maximum cross section of the knurls is slightly larger than the cross section of the canals. The spikes are force fit into the canals so as to be held firmly therein. In an illustrated embodiment, the base of the device is made from ultraviolet light-protected polycarbonate plastic in a variety of colors to match the area covered.

10 Claims, 3 Drawing Sheets

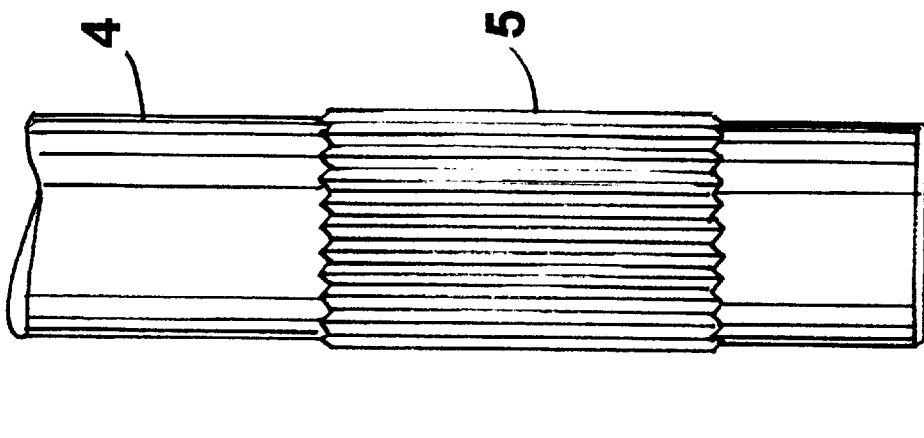
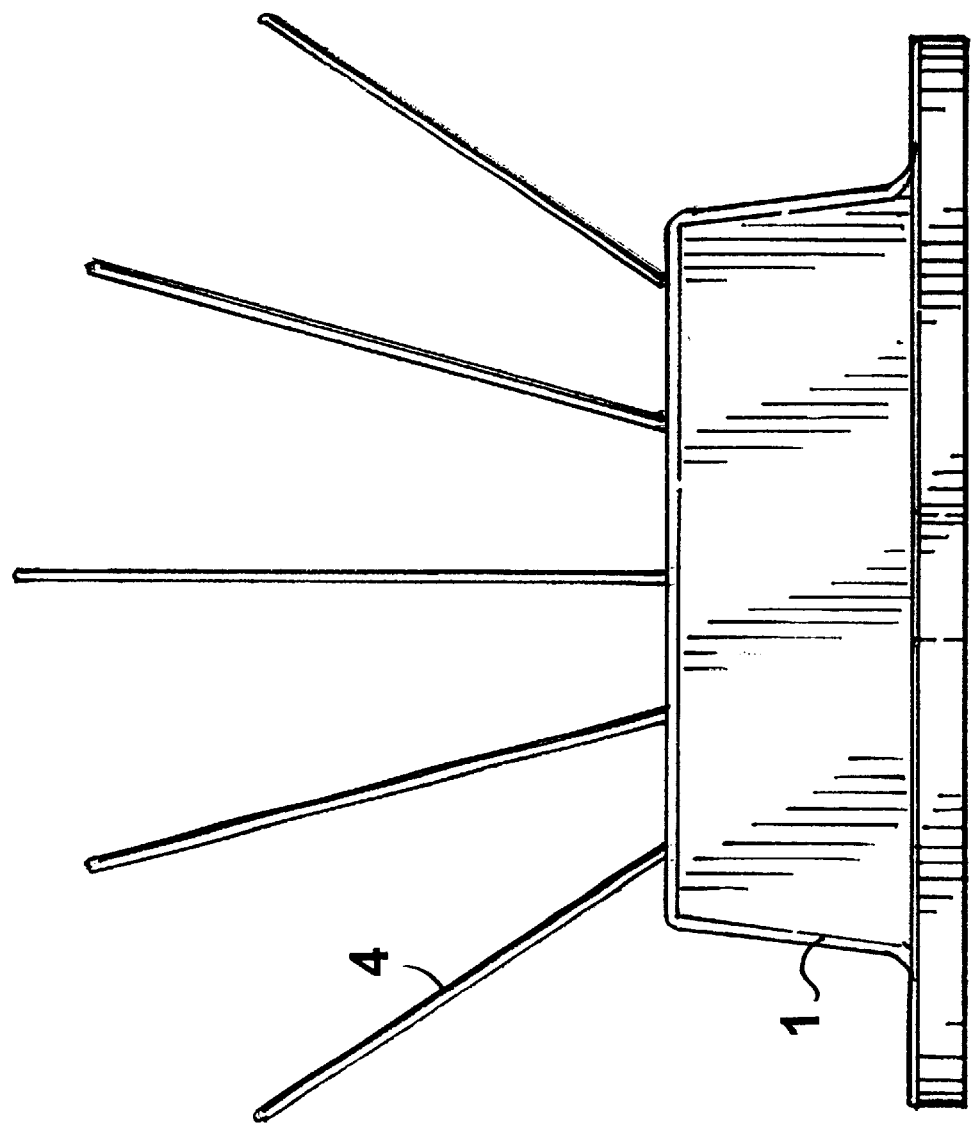

PREVENTIVE DEVICE AGAINST NUISANCE FROM BIRDS

BACKGROUND OF THE INVENTION

1. Field of the Invention

This invention relates to bird proofing assemblies, and more particularly to a device for preventing birds from landing on certain surfaces.

2. Background Art

Birds often try to land on even the narrowest surfaces that they can find on outer structures of buildings, window sashes, sills, ledges, statues, wall ridges, roof gutters, portals, bridges, towers, masts, etc.

This alighting and resting is a nuisance in that the birds, through their droppings, dirty and damage not only the landing surface, but also all outer structures of the building that are underneath.

Due to aesthetic reasons and also to avoid irreversible damaging of the structure material, one is often obliged to deal with frequent and expensive renovation work of the damaged parts of the building.

Besides, such a building is quite often located next to human activities. This is for example the case in cities, where such birds' droppings as well as birds' cries might commercially impact a whole area, whether it be a living area, a mall area or restaurants.

One of the most efficient ways of preventing this nuisance consists in covering surfaces with a device comprising a bottom base support from which extend upwardly birds' dissuasive spike elements.

It can be demonstrated that such a device does not hurt the birds but only prevents alighting and resting.

Such a device is described in U.S. Pat. No. 5,400,552. Unfortunately, the device disclosed therein has at least two drawbacks. First, the spikes are secured in canals by flattening out a portion of each spike adjacent the end to be held in the canal. Flattened out portions are made to extend in only two directions from the axis of the spike, thereby creating a press-fit engagement with the canal along two distinct lines. It would be preferred if the engagement between spike and canal were more evenly distributed around the entire radial surface of the spike to provide a more secure and structurally sound interface. Second, the spikes all extend in parallel from the base, such as straight up from the base in a direction perpendicular to the underlying surface. It would be preferred to have the spikes directed at different angles to increase the volumetric efficacy of the spikes, but in a manner that does not increase cost of fabrication.

SUMMARY OF THE INVENTION

It is therefore an object of the present invention to provide a system to overcome the above mentioned drawbacks. The system according to the present invention comprises a base support attached to a surface to be protected against birds alighting. Dissuasive spike elements extend from a side of the base support, opposite to the side attached to the surface to be protected. The base support features canals and each spike includes a knurled portion. The knurled portion is obtained by a knurling process of the material of which each spike element is made and results in a maximum size slightly larger than the diameter of the canals. The spike elements are then forced into the canals so as to ensure fastening of the spike elements to the base support. In a preferred embodiment, the center spike is straight while offset spikes are bent to extend from the canal at a selected angle to provide a radial array of spikes. Each canal is provided with bend radius to facilitate the bending of a spike. The radial surface of the knurled portion extends around the entire circumference of the spike to achieve the desired distributed interface of spike and canal surfaces not found in the prior art. Moreover, the bend radius built into each canal provides a useful way to distribute spikes over different angles while permitting machine fabrication without increasing labor-related costs.

BRIEF DESCRIPTION OF THE DRAWINGS

The invention will be better understood from the following detailed description read in conjunction with the following drawings:

FIG. 3 is an enlarged view of the knurled end of a spike; and

FIG. 4 is an enlarged end view of the invention.

DETAILED DESCRIPTION OF A PREFERRED EMBODIMENT

Figure 1:
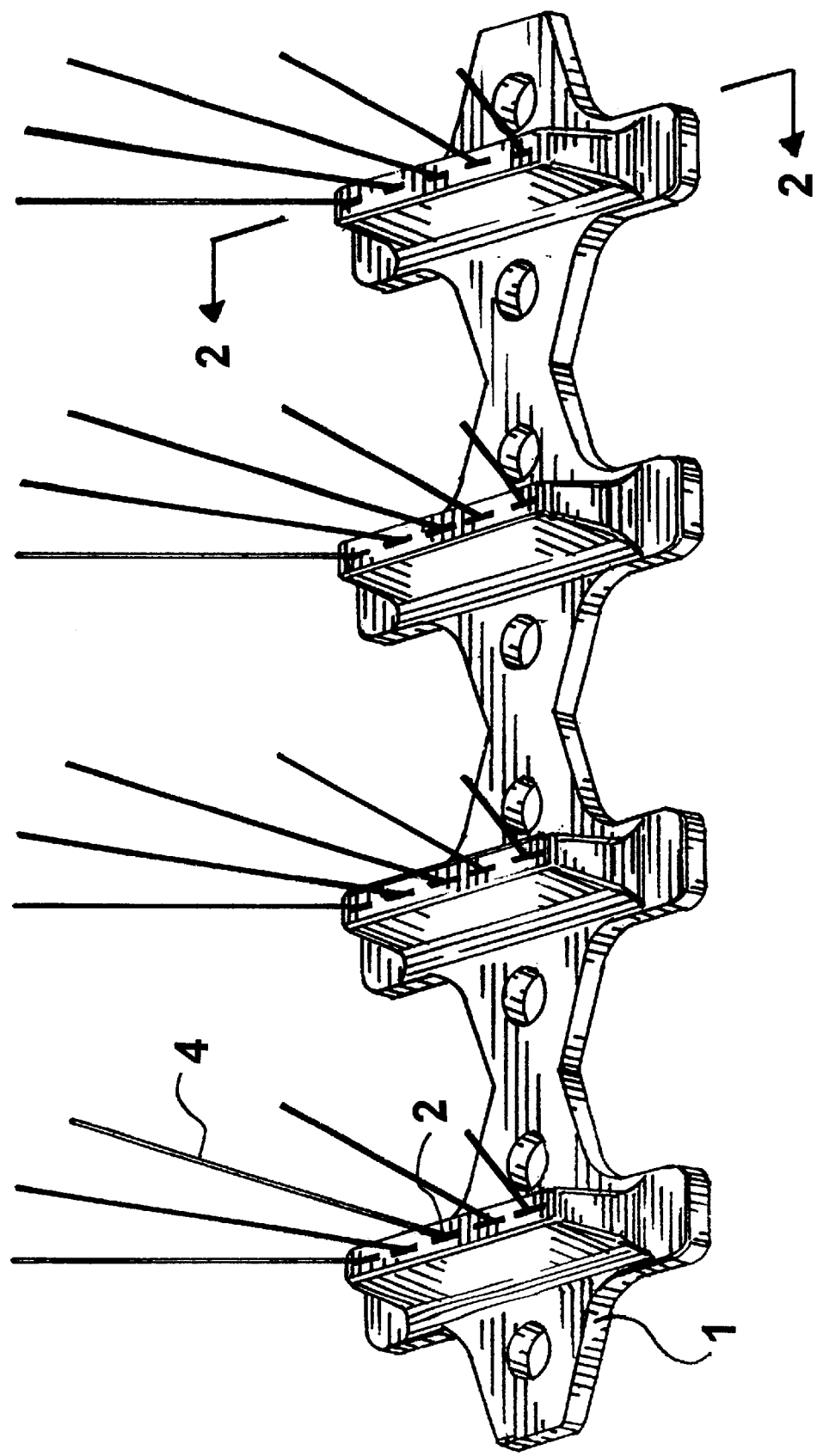
FIG. 1 is a view in perspective of a preferred embodiment of the present invention.

FIG. 1 is a view in perspective of the device constructed according to the principles of the present invention. A base support 1 comprises canals 2 in each of which is lodged a spike element 4. In use, the base support 1 is attached to a surface to protect (not shown) against birds landing. The base support 1 can be made of a variety of materials including wood, metal and plastics, but in the preferred embodiment polycarbonate plastic is used for its resistance to impacts, temperature variations and ultraviolet waves from the sun, that ensure long term stability of elastic properties as well as color of the base support.

The axis of the off-center spikes relative to the base support is preferably at an angle between 30 and 75 degrees, while the axis of the center spike is preferably at 90 degrees relative to the base support.

Figure 2:
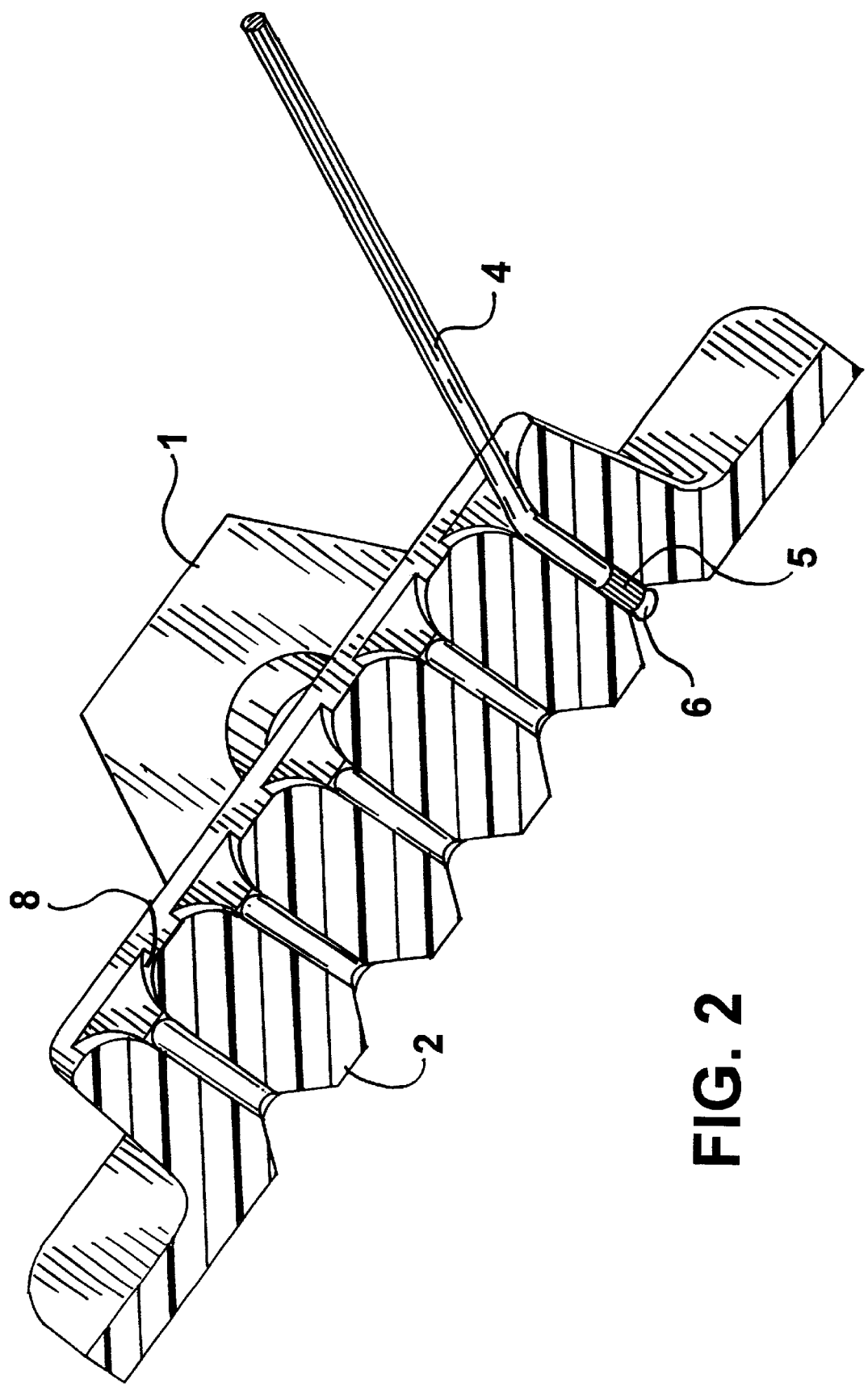
FIG. 2 is a transverse view in section showing spike elements fastened to a base support of the present invention.

FIG. 2 is a transverse view in section of the fastening of a spike element to the base support 1. The base support comprises a canal 2 in which is lodged a tip 6 of the spike element 4. The spike element 4 features a knurled portion 5 of a maximum diameter slightly larger than the diameter of the canal 2, at a distance from the bottom tip smaller than the length of a canal.

The canal can go clear through the base support, in which case, at manufacturing time, the spike element 4 is engaged through one opening of the canal 2 on the bottom surface of the base support, then forced into the canal 2, until its bottom extremity extends at or above said bottom surface. Fastening is ensured by the knurled portion 5 of the spike element 4 deforming inside the canal 2, the material of which the base support is made. The knurled portion 5 also allows automatic centering of the spike element along the axis of the canals. The spike element may also be engaged through and forced in the canal from the upper surface of the base support. The spikes may then be bent to a desired extent around bend surfaces 8 above canal 2 (side spikes) or left straight (center spike) as shown in FIGS. 2 and 3.

The knurled portion 5 (seen best in FIG. 4) is obtained by a knurl processing of the material of which the spike element 4 is made. This material must therefore be malleable enough so as to not be rendered fragile by the knurling. Amongst materials with required characteristics, stainless steel 302 (DIN 17224) allows a spike element of a diameter of 1.3 mm, with a knurled part of 1.53 mm diameter. The knurled portion 5 can be circularly shaped as shown on the figure, but other shapes can be contemplated. Also, spike elements 4 and canals 2 could have as a cross-section, a parallelepiped, a circle or a triangle. The tool that carries out the knurling is a machine well-known to those skilled in the art.

What is claimed is:

1. A bird proofing device comprising:

a base support for attachment to a surface to be protected;

a plurality of canals extending completely through said base support with each of said canals having a first diameter; and a plurality of spike elements, one spike element inserted in each of said canals and extending above said base support, each spike element having a knurled portion, each of the knurled portions having a second diameter greater than the first diameter of said canals, and each of said spike elements having at least one knurled portion positioned inside of one of said canals, whereby each spike element is secured in one of said canals by at least one of said knurled portions;

wherein each of said canals has curved side walls that are splayed outwardly from an upper end of the canal toward a top surface of said base support.

2. The device of claim 1 wherein at least one of said spike elements is bent at an angle of from 30 to 75 degrees relative to the base support.

3. The device of claim 1 wherein the knurled portion of one of said spike elements substantially aligns a longitudinal axis of the one spike element with a longitudinal axis of the canal in which the one spike element is inserted.

4. The device of claim 1 wherein said base support comprises polycarbonate plastic.

5. The device of claim 1 wherein at least one of said spike elements comprises stainless steel.

6. A bird proofing device comprising:

a base support for attachment to a surface to be protected, the base support having a bottom surface and a top surface;

a plurality of canals extending completely through said base support from said bottom surface to said top surface, each of said canals having a first diameter;

a plurality of spike elements, one spike element inserted in each of said canals and extending above said based support; and a plurality of bottom tips with each bottom tip forming one end of each spike element, each of said spike elements having the bottom tip positioned on one of said canals, each spike element having a knurled portion, each of the knurled portions being positioned above said bottom tip within one of said canals and having a second diameter greater than the first diameter of said canals such that the knurled portion deforms the one canal in which it is positioned, whereby each spike element is secured in one of said canals by at least one of said knurled portions;

wherein each of said canals has curved side walls that are splayed outwardly from an upper end of the canal toward a top surface of said base support.

7. The device of claim 6 wherein at least one of said spike elements is bent at an angle of from 30 to 75 degrees relative to the base support.

8. The device of claim 6 wherein the knurled portion of one of said spike elements substantially aligns a longitudinal axis of the one spike element with a longitudinal axis of the canal in which the one spike element is inserted.

9. The device of claim 6 wherein said base support comprises polycarbonate plastic.

10. The device of claim 6 wherein at least one of said spike elements comprises stainless steel.

* * * * *